(12) United States Patent
Moon et al.

(10) Patent No.: US 10,667,095 B2
(45) Date of Patent: *May 26, 2020

(54) APPARATUS AND METHOD FOR MANAGING A TELEPHONE NUMBER IN A TERMINAL

(71) Applicant: Samsung Electronics Co., Ltd., Gyeonggi-do (KR)

(72) Inventors: Kyung-Chun Moon, Gyeonggi-do (KR); Dae-Hyun Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,064

(22) Filed: Aug. 23, 2018

(65) Prior Publication Data

US 2018/0367963 A1    Dec. 20, 2018

Related U.S. Application Data

(63) Continuation of application No. 14/133,995, filed on Dec. 19, 2013, now Pat. No. 10,064,022.

(30) Foreign Application Priority Data

Dec. 21, 2012    (KR) .......................... 10-2012-0151308

(51) Int. Cl.
*H04W 4/12*    (2009.01)

(52) U.S. Cl.
CPC .................................... *H04W 4/12* (2013.01)

(58) Field of Classification Search
None
See application file for complete search history.

(56) References Cited

U.S. PATENT DOCUMENTS 6,826,397 B1    11/2004    Vasa
6,950,648 B2    9/2005    Pappalardo et al.
(Continued)

FOREIGN PATENT DOCUMENTS

JP    2010-068060 A    3/2010
KR    2003-0023503 A    3/2003
(Continued)

OTHER PUBLICATIONS

Korean Search Report dated Oct. 6, 2018.
Call Memo-Smart Dialer, MobAxe Software Solutions Ltd., 2010.

*Primary Examiner* — Ajit Patel
(74) *Attorney, Agent, or Firm* — Cha & Reiter, LLC (57) ABSTRACT

An apparatus and a method manage a telephone number in a terminal, which can separately manage telephone numbers, a call to each of which an attempt to originate has been made and to each of which the call has failed to be connected, and then enable a convenient attempt to re-originate a call to the telephone number. The apparatus includes: a memory including a temporary list which stores a non-connecting telephone number, to which a call has been originated and has failed to be connected; and a controller for performing a control operation so as to store a particular telephone number in the temporary list as the non-connecting telephone number, when an attempt to originate a call to the particular telephone number is made and the call fails to be connected to the particular telephone number.

22 Claims, 8 Drawing Sheets

(56) References Cited

U.S. PATENT DOCUMENTS

| | | | |
|---|---|---|---|
| 7,233,229 B2 | 6/2007 | Stroupe et al. | |
| 8,437,779 B2* | 5/2013 | Phukan | H04M 1/274516 |
| | | | 455/456.3 |
| 2002/0154744 A1 | 10/2002 | Mori | |
| 2003/0087668 A1 | 5/2003 | Lee et al. | |
| 2004/0207722 A1 | 10/2004 | Koyama et al. | |
| 2004/0259543 A1 | 12/2004 | Lee et al. | |
| 2005/0096092 A1 | 5/2005 | Lee | |
| 2005/0114021 A1* | 5/2005 | Krull | G01C 21/362 |
| | | | 701/410 |
| 2005/0138177 A1 | 6/2005 | Davis | |
| 2005/0289180 A1* | 12/2005 | Pabla | G06Q 10/10 |
| 2006/0050686 A1 | 3/2006 | Velez-Rivera et al. | |
| 2006/0168539 A1 | 7/2006 | Hawkins et al. | |
| 2006/0251237 A1 | 11/2006 | Singer | |
| 2007/0135110 A1 | 6/2007 | Athale et al. | |
| 2007/0190986 A1 | 8/2007 | Lee | |
| 2008/0057927 A1 | 3/2008 | Han | |
| 2009/0061813 A1 | 3/2009 | Ruggerio | |
| 2009/0104895 A1* | 4/2009 | Kasturi | H04M 1/274583 |
| | | | 455/414.1 |
| 2010/0061532 A1 | 3/2010 | Takiguchi | |
| 2010/0062714 A1 | 3/2010 | Ozaki | |
| 2010/0069045 A1* | 3/2010 | Grignani | H04M 1/2745 |
| | | | 455/414.1 |
| 2010/0074424 A1 | 3/2010 | Ito | |
| 2010/0330972 A1* | 12/2010 | Angiolillo | H04M 1/274583 |
| | | | 455/418 |
| 2011/0098089 A1 | 4/2011 | Irie et al. | |
| 2011/0119641 A1 | 5/2011 | Lee | |
| 2012/0124218 A1 | 5/2012 | Nakamura et al. | |
| 2013/0122877 A1 | 5/2013 | Wang et al. | |

FOREIGN PATENT DOCUMENTS

| | | |
|---|---|---|
| KR | 10-2004-0025350 A | 3/2004 |
| KR | 10-2005-0108964 A | 11/2005 |
| KR | 10-2006-0075972 A | 7/2006 |
| KR | 10-2007-0077947 A | 7/2007 |
| KR | 10-2007-0102101 A | 10/2007 |
| KR | 10-0792435 B1 | 1/2008 |
| KR | 10-2009-0096192 A | 9/2009 |
| KR | 10-2010-0042673 A | 4/2010 |
| KR | 10-2012-0046368 A | 5/2012 |

* cited by examiner

APPARATUS AND METHOD FOR MANAGING A TELEPHONE NUMBER IN A TERMINAL

CROSS REFERENCE TO RELATED APPLICATIONS

This application is a Continuation of U.S. patent application Ser. No. 14/133,995 filed on Dec. 19, 2013 which claims, pursuant to 35 U.S.C. § 119(a), priority to and the benefit of the earlier filing date of Korean Patent Application Serial No. 10-2012-0151308, which was filed in the Korean Intellectual Property Office on Dec. 21, 2012, the entire contents of which is hereby incorporated by reference.

BACKGROUND

1. Technical Field

The present disclosure relates generally to an apparatus and a method for managing a telephone number in a terminal, and more particularly, to an apparatus and a method for managing a telephone number in a terminal which can separately manage a telephone number, a call to which an attempt to originate has been made and to which the call has failed to be connected, and then enable a convenient attempt to re-originate a call to the telephone number.

2. Description of the Related Art

In the prior art, there are numerous reasons why a call is not connected after a terminal originates the call, which can be classified into five general reasons as follows:

1) when the other party is absent (a missed call),
2) when a call origination fails due to network problems, an error of the originating terminal or the like (call origination failure),
3) when another urgent matter comes up and a telephone call cannot be made right now (call hold),
4) when a call to a telephone number is originated and is immediately completed in order to temporarily store the telephone number (the temporary storage of the telephone number), and
5) when the reason why a telephone call is to be made disappears (intentional completion).

In the case of the other reasons except for the fifth reason, there is a significantly high probability of attempting to re-originate a call to a relevant telephone number within a predetermined time period. However, a terminal in the prior art does not provide a function of separately displaying or storing a telephone number, to which a call is originated and fails to be connected. Accordingly, a terminal in the prior art has an inconvenience in that a list of all call records must be searched for the specific telephone number to call again.

In particular, in the case of the fourth reason, a temporary telephone number for temporarily performing a call can also be stored in a telephone directory in order to temporarily store the temporary telephone number. However, in this case, a terminal in the prior art may operate in association with an application (for example, KAKAO TALK, a mobile messenger application for smartphones commercially available from KAKAO INC.) which provides services based on a telephone directory, in such a manner that a user does not intend to use the terminal. Subsequently, a terminal in the prior art has difficulty in searching for these temporary telephone numbers and arranging them.

SUMMARY

Accordingly, an aspect of the present invention is to provide an apparatus and a method for managing a telephone number in a terminal, which can separately manage a telephone number, a call to which an attempt to originate has been made and to which the call has failed to be connected, and then enable a convenient attempt to re-originate a call to the telephone number.

Another aspect of the present invention is to provide an apparatus and a method for managing a telephone number in a terminal, which can notify a user that the user is to attempt to originate a call to a telephone number, a call to which an attempt to originate has been made and to which the call has failed to be connected.

Further, still another aspect of the present invention is to provide an apparatus and a method for managing a telephone number in a terminal, which can separately manage a telephone number, the temporary storage of which is selected, and then enable a convenient attempt to originate a call to the telephone number.

In order to achieve the above objects, in accordance with an aspect of the present invention, an apparatus for managing a telephone number in a terminal is provided. The apparatus includes: a memory including a temporary list which stores a non-connecting telephone number, a call to which an attempt to originate has been made and to which the call has failed to be connected; and a controller for performing a control operation so as to store a particular telephone number in the temporary list as the non-connecting telephone number, when an attempt to originate a call to the particular telephone number is made and the call fails to be connected to the particular telephone number.

In accordance with another aspect of the present invention, a method for managing a telephone number in a terminal is provided. The method includes: attempting to originate a call to a particular telephone number; and storing the particular telephone number, to which the call fails to be connected, in a temporary list as a non-connecting telephone number, when the attempt to originate the call to the particular telephone number has been made and the call fails to be connected to the particular telephone number.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings. It should be noted that in the accompanying drawings, the same elements will be designated by the same reference numerals as far as possible although they are shown in different drawings. In the following description, a detailed explanation of known related functions and constructions may be omitted to avoid unnecessarily obscuring the subject matter of the present invention. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

Among the terms set forth herein, a non-connecting telephone number is a call to which an attempt to originate has been made and to which the call has failed to be connected.

Terminals according to an exemplary embodiment of the present invention include a portable terminal and a fixed terminal. In this case, portable terminals, which are electronic devices portable so as to be easily carried, may include a video phone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an e-book, portable computers (e.g. a laptop, a tablet PC, etc.), a digital camera, etc. In addition, the fixed terminal may be a desktop personal computer or the like.

Figure 1:
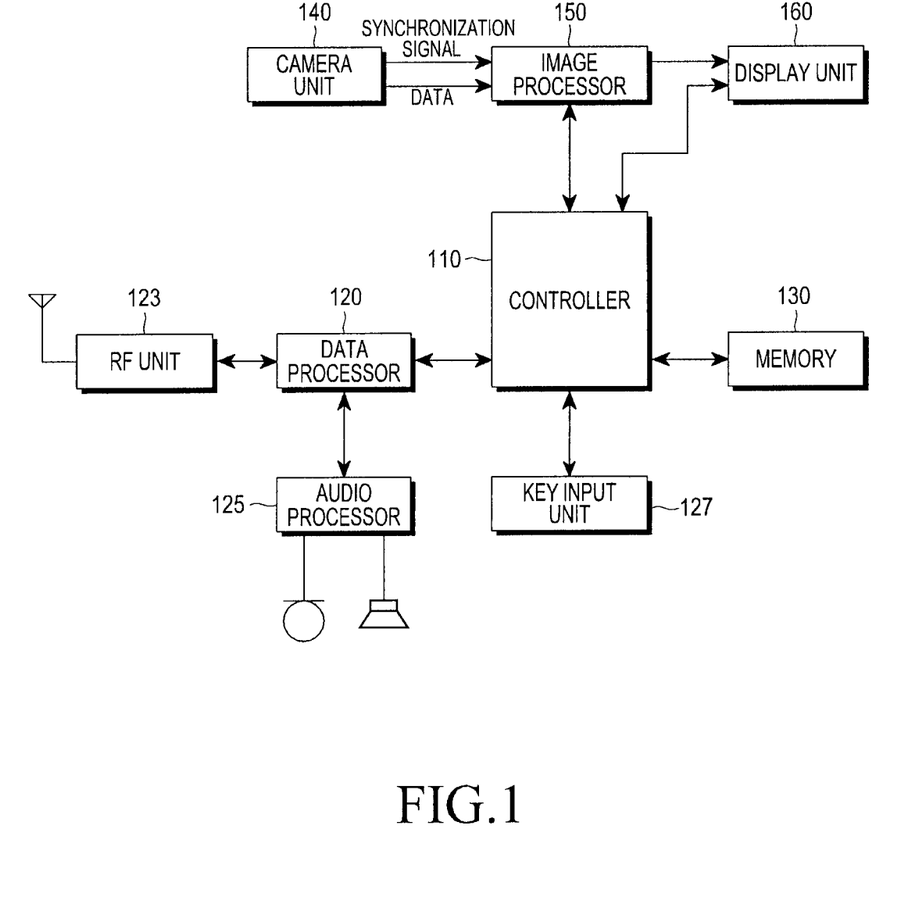
FIG. 1 is a block diagram showing the configuration of a terminal according to an exemplary embodiment of the present invention.

FIG. 1 is a block diagram showing the configuration of a terminal according to the exemplary embodiment of the present invention.

Referring to FIG. 1, an RF unit 123 performs a wireless communication function of the terminal. The RF unit 123 includes an RF transmitter for upconverting the frequency of a signal to be transmitted and then amplifying the frequency-unconverted signal, and an RF receiver for low-noise amplifying a received signal and then downconverting the frequency of the low-noise amplified signal, etc. A data processor 120 includes a transmitter for encoding and modulating a signal to be transmitted, and a receiver for demodulating and decoding a signal received by the RF unit 123, etc. In particular, the data processor 120 may include a modulator/demodulator (modem) and a coder/decoder (codec). In this case, the codec includes a data codec for processing packet data and the like, and an audio codec for processing audio signals including voice and the like. An audio processor 125 reproduces a received audio signal, which has been output from the audio codec of the data processor 120, and outputs from a speaker the reproduced audio signal as audio, or transmits an audio signal to be transmitted, which is generated from a microphone, to the audio codec of the data processor 120.

A key input unit 127 may include keys for inputting numbers and text information and function keys for setting various functions, and may include a touch screen known in the art.

A memory 130 may include a program memory and a data memory. The program memory may store programs for controlling a general operation of the terminal, and programs for performing a control function of storing both a non-connecting telephone number, a call to which an attempt to originate has been made and to which the call has failed to be connected, and a temporary telephone number in a temporary list and managing them. In addition, the data memory permanently or temporarily stores data such as settings of the terminal as well as telephone numbers and contact lists, and temporarily stores data generated while the programs are performed.

According to the exemplary embodiment of the present invention, the memory 130 includes the temporary list which stores a non-connecting telephone number, a call to which an attempt to originate has been made and to which the call has failed to be connected, and a temporary telephone number.

A controller 110 controls an overall operation of the terminal.

According to the exemplary embodiment of the present invention, when an attempt to originate a call to a particular telephone number is made and the call fails to be connected to particular the telephone number, the controller 110 performs a control operation for storing the particular telephone number in the temporary list as the non-connecting telephone number.

Then, according to the exemplary embodiment of the present invention, when the temporary storage of the particular telephone number is selected, the controller 110 performs a control operation for storing the particular telephone number in the temporary list as the temporary telephone number.

According to the exemplary embodiment of the present invention, the controller 110 performs a control operation for displaying non-connecting telephone numbers, in which a call to each of which an attempt to originate has been made and to each of which the call has failed to be connected, in such a manner as to distinguish the non-connecting telephone numbers from other telephone numbers, which may be stored in a latest record list representing an entire call list.

According to the exemplary embodiment of the present invention, the controller 110 performs a control operation for displaying the non-connecting telephone number and the temporary telephone number in such a manner as to distinguish the non-connecting telephone number from the temporary telephone number in the temporary list.

According to the exemplary embodiment of the present invention, when the editing of a particular telephone number in the temporary list is selected, the controller 110 performs a control operation for performing at least one of the addition of a memo into which information on the particular telephone number is entered, an alarm setting for reporting the origination of a call to the particular telephone number at a particular time point, and a schedule setting for reporting the origination of a call to the particular telephone number at a particular time point on a particular date.

According to the exemplary embodiment of the present invention, the controller 110 performs a control operation for displaying non-connecting call origination details in a standby mode of the terminal. When the non-connecting call origination details are selected, the controller 110 performs a control operation for displaying a particular telephone number matched to the non-connecting call origination details in the temporary list. The non-connecting call origination details may be displayed in a notification bar, in a window, or on a lock screen in the standby mode.

Then, when an attempt to originate a call to the particular telephone number, matched to the non-connecting call origination details in the temporary list, is made and the call fails to be connected to the particular telephone number, if the number of times of failure of a call connection to the particular telephone number to which the call fails to be connected is equal to or less than a predetermined reference number of times, the controller 110 performs a control operation for displaying the number of times of failure in the call connection to the particular telephone number in the temporary list, as well as updating the temporary list to store and display the current number of times of such failure in the call connection.

According to the exemplary embodiment of the present invention, when the attempt to originate the call to the particular telephone number, matched to the non-connecting call origination details in the temporary list, is made and the call fails to be connected to the particular telephone number, if the number of times of failure in the call connection to the particular telephone number is greater than the predetermined reference number of times, the controller 110 causes the terminal to automatically switch to a message mode.

According to the exemplary embodiment of the present invention, when the attempt to originate the call to the particular telephone number, matched to the non-connecting call origination details in the temporary list, is made and the call fails to be connected to the particular telephone number, if the number of times of failure in a call connection to the particular telephone number is greater than the predetermined reference number of times, the controller 110 performs a control operation for automatically transmitting a message having previously-set contents to the particular telephone number to notify a user of the number of times of failure.

According to the exemplary embodiment of the present invention, when an attempt to originate a call to the particular telephone number, matched to the non-connecting call origination details in the temporary list, is made and the call is successfully connected to the particular telephone number, if the particular telephone number is a telephone number registered in a telephone directory, the controller 110 performs a control operation for deleting the particular telephone number from the temporary list.

Otherwise, according to the exemplary embodiment of the present invention, when the attempt to originate the call to the particular telephone number, matched to the non-connecting call origination details in the temporary list, is made and the call is successfully connected to the particular telephone number, if the particular telephone number is not a telephone number registered in the telephone directory, the controller 110 performs a control operation for displaying a selection menu which displays the particular telephone number. The controller 110 performs a control operation for storing the particular telephone number in the telephone directory when the storage of the telephone directory is selected from the selection menu, and performs a control operation for deleting the particular telephone number from the temporary list when a deletion is selected from the selection menu.

According to the exemplary embodiment of the present invention, the controller 110 performs a control operation for displaying a particular telephone number, for which a schedule is set on a particular date among telephone numbers of the temporary list, in a schedule mode. When the particular date is selected, the controller 110 performs a control operation for displaying information on the particular telephone number associated with the selected particular date.

In addition, the terminal may include a camera unit 140 which includes a camera sensor for capturing a light signal as image data and converting the captured light signal to an analog image signal in the form of an electrical signal, and a signal processor for converting the analog image signal, which has been captured by the camera sensor, to digital data. In this case, in the exemplary embodiment, the camera sensor is a Charge-Coupled Device (CCD) sensor or a Complementary Metal-Oxide Semiconductor (CMOS) sensor, and the signal processor may be implemented by using a Digital Signal Processor (DSP). In addition, the camera sensor and the signal processor may be implemented as one unit, or may be implemented as separate elements. As shown in FIG. 1, the camera unit 140 may also generate a synchronization signal in a manner known in the art, and transmits any of the digital data, the analog image signal, and the synchronization signal to an image processor 150.

The image processor 150 performs image signal processing (ISP) on the digital data or the analog image signal, in a manner known in the art, for displaying an image signal, which corresponds to the digital data or the analog image signal output from the camera unit 140, on the display unit 160. In this case, the term "ISP" refers to the execution of functions including a gamma correction, an interpolation, a spatial change, an image effect, an image scale, Auto White Balance (AWB), Auto Exposure (AE), Auto Focus (AF), etc.

Accordingly, the image processor 150 processes the digital data or the analog image signal, which has been output from the camera unit 140, on a frame-by-frame basis, and outputs the frame image data in such a manner as to meet the characteristics and the size of a screen of the display unit 160. In addition, the image processor 150 includes an image codec, and compresses the frame image data displayed on the display unit 160 using a predetermined compression method known in the art, or restores the compressed frame image data to an original frame image data. In this case, the image codec may be implemented by using either a Joint Photographic Coding Experts Group (JPEG) codec, a Moving Picture Experts Group-4 (MPEG-4) codec, a Wavelet codec, or the like. In the exemplary embodiment, the image processor 150 includes an On-Screen Display (OSD) function. The image processor 150 may output on-screen display data according to the size of the screen displayed on the display unit 160 under the control of the controller 110.

The display unit 160 displays an image signal, which is output by the image processor 150, on the screen, and displays user data which is output by the controller 110. In this case, the display unit 160 may employ or include a Liquid Crystal Display (LCD), and thus may include an LCD controller, a memory capable of storing image data, an LCD display element, etc. When the LCD and/or the key input unit 127 employs a touch screen, the display unit 160 may operate as an input unit complementary to or instead of the key input unit 127. In one exemplary embodiment, the display unit 160 may display keys which are identical to those of the key input unit 127, while in an alternative embodiment, the key input unit 127 is included in or connected to the display unit 160 to implement a touch screen in a manner known in the art.

When the display unit 160 employs the touch screen and thus is used as a touch screen unit, the touch screen unit includes a Touch Screen Panel (TSP) including multiple sensor panels or sensor elements. The multiple sensor panels or sensor elements may include a capacitive/electrostatic sensor panel capable of recognizing a user's finger touch or proximity of the user's finger to the sensor panel, and an electromagnetic sensor panel capable of sensing a delicate touch, such as a touch of a stylus.

An operation of managing a particular telephone number stored in a temporary list in the terminal as described above will be described in detail with reference to FIGS. 2-5B.

Figure 2:
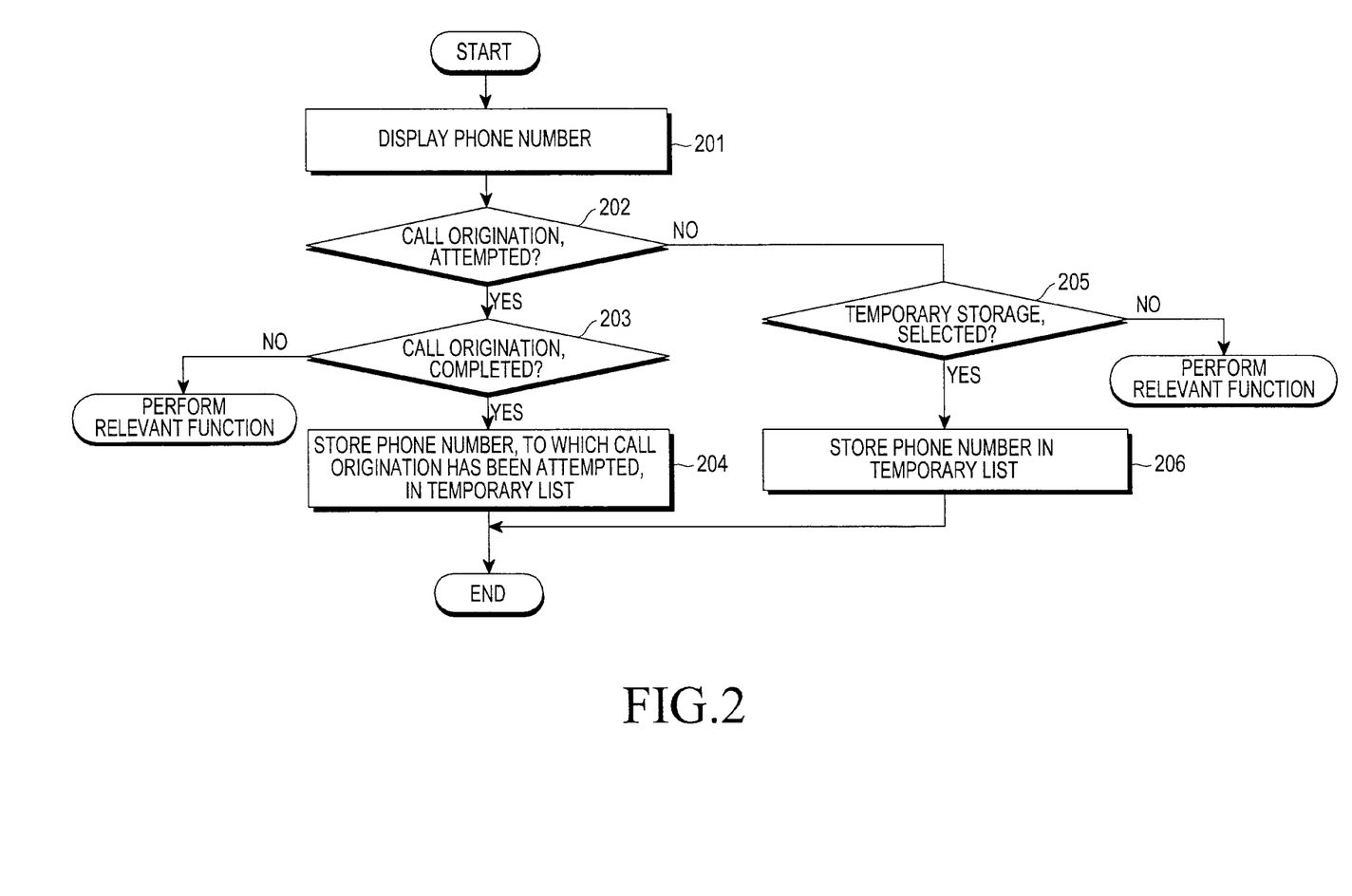
FIG. 2 is a flowchart showing a process for storing a particular telephone number in a temporary list in the terminal according to the exemplary embodiment of the present invention.

FIG. 2 is a flowchart showing a process for storing a particular telephone number in a temporary list in the terminal according to the exemplary embodiment of the present invention.

Hereinafter, the exemplary embodiment of the present invention will be described in detail with reference to FIG. 2 together with reference to FIG. 1.

Referring to the FIG. 2, when an attempt to originate a call due to the input of a call button is selected in step 201, in which a selected or input telephone number is displayed by the display unit 160 of the terminal, the controller 110 first senses the selection of the attempt to originate a call and then attempts to originate the call to the selected or input telephone number, the call to which the attempt to originate is to be made, in step 202. However, when the origination of the call is completed in a state where the call is not connected to the selected or input telephone number, the call to which the attempt to originate has been made, the controller 110 senses the completion of the origination of the call, in step 203, and proceeds to step 204. In step 204, the controller 110 stores the telephone number, the call to which the attempt to originate has been made, in a temporary list of the memory 130, and the method then ends. On the other hand, if in step 203, the controller 110 does not sense the completion of the origination of the call, the controller 110 performs a different or relevant function of the terminal.

In a state where a call is originated and is not connected due to reasons such as the completion of the origination of a call due to a network error, the completion of the origination of a call which occurs because a recipient does not receive the call, and the origination of a call that an originator attempts and immediately completes, the controller 110 receives a discrimination value representing each case, in which the origination of a call is completed, from a base station. Accordingly, as in step 203, the controller 110 may determine the completion of the origination of the call in a state where the call is not connected to the telephone number, the call to which the attempt to originate has been made.

Otherwise, referring back to step 202, when the temporary storage of the telephone number is selected while the telephone number is displayed in step 201, and the controller 110 does not sense the selection of the attempt to originate a call and then attempts to originate the call to the selected or input telephone number, the call to which the attempt to originate is to be made, in step 202, the controller 110 senses the selection of the temporary storage of the telephone number, in step 205, and if the selection of the temporary storage of the telephone number is sensed, the method proceeds to step 206. In step 206, the controller 110 stores the telephone number in the temporary list of the memory 130, as a temporary telephone number, and the method then ends. On the other hand, if in step 206, the controller 110 does not sense the selection of the temporary storage of the telephone number, the controller 110 performs a different or relevant function of the terminal.

Figure 3A:
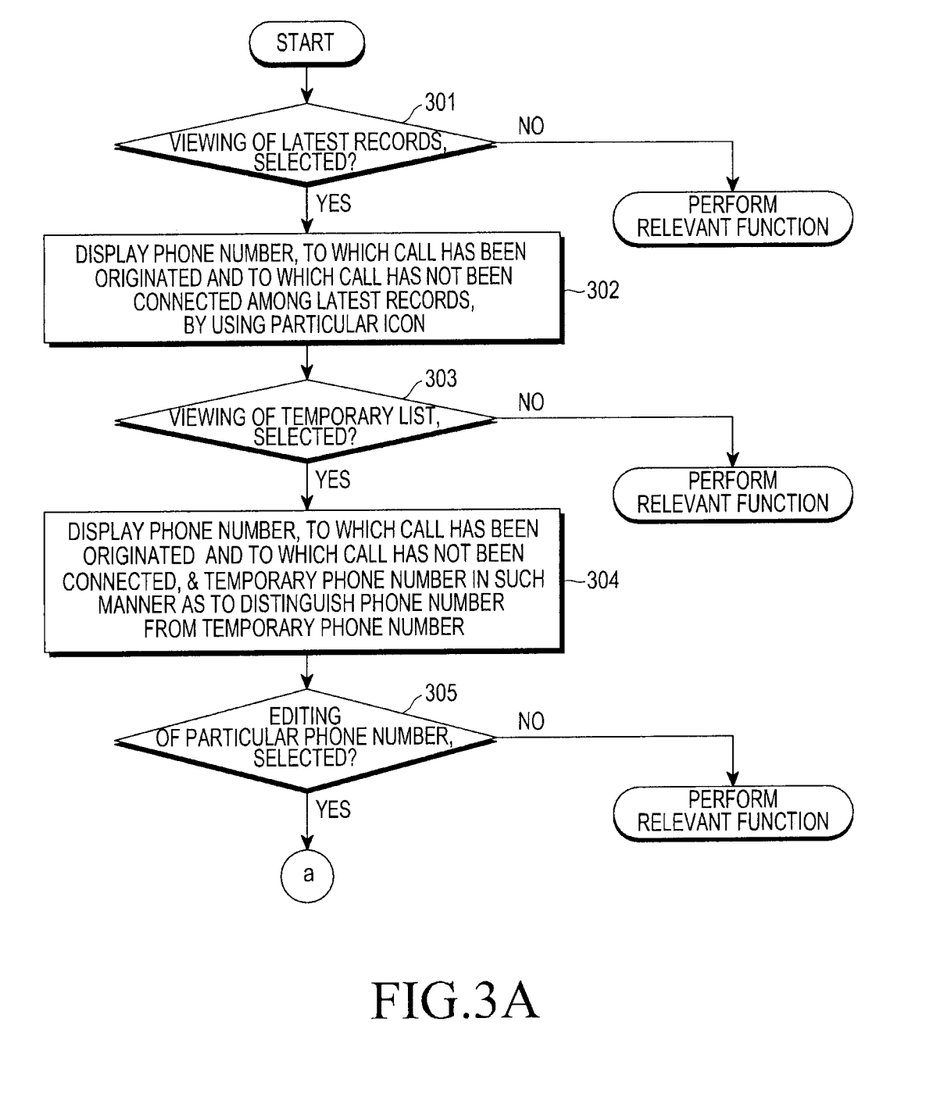
FIG. 3A and FIG. 3B are a single flowchart showing a process for displaying and editing telephone numbers stored in the temporary list in the terminal according to the exemplary embodiment of the present invention.
Figure 3B:
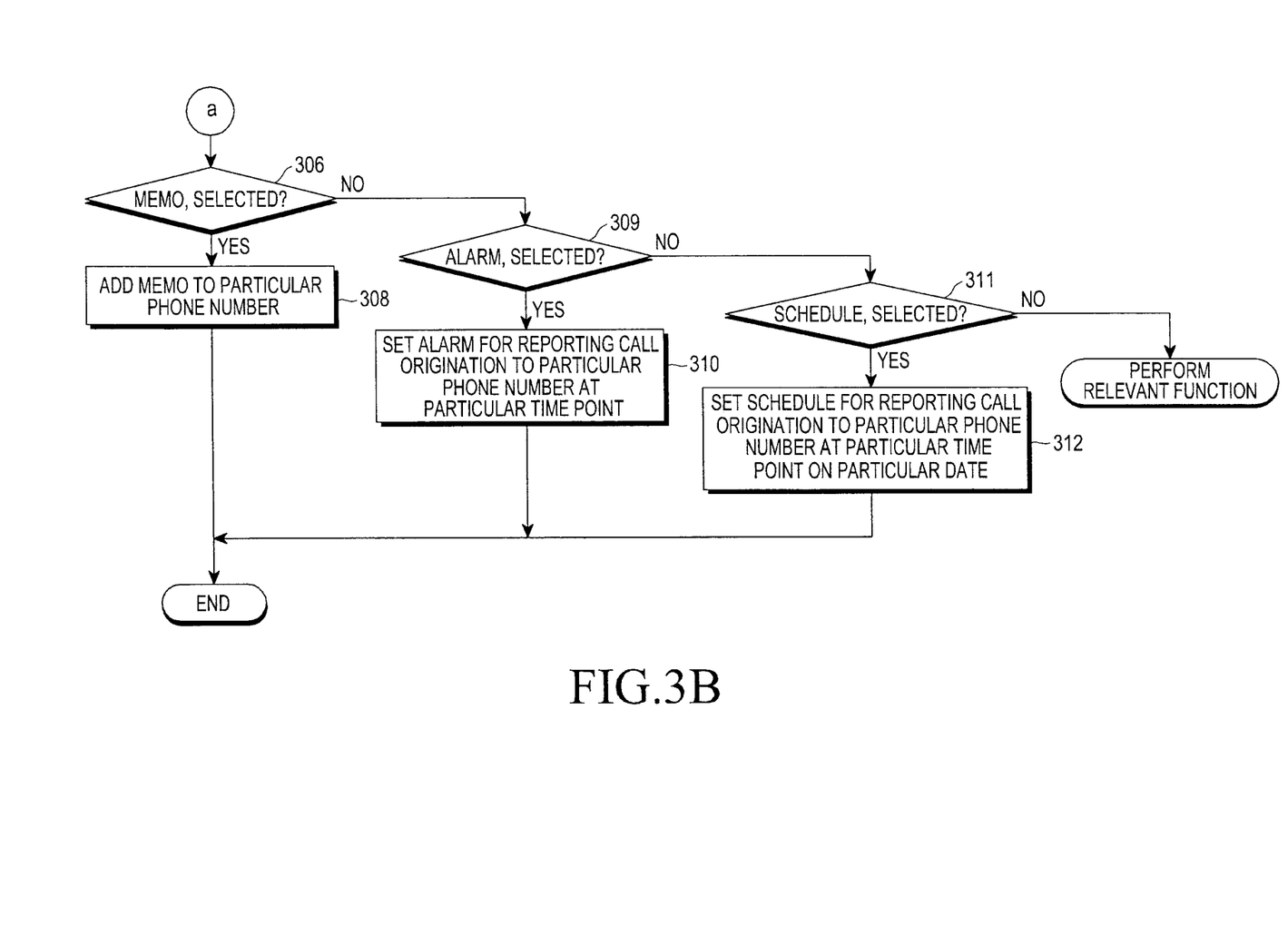

FIG. 3A and FIG. 3B are a single flowchart showing a process for displaying and editing telephone numbers stored in the temporary list in the terminal according to the exemplary embodiment of the present invention. FIG. 4A to FIG. 4D are views illustrating an operation of displaying and editing a telephone number stored in the temporary list in the terminal according to the exemplary embodiment of the present invention.

Hereinafter, the exemplary embodiment of the present invention will be described in detail with reference to FIGS. 3A and 3B and FIGS. 4A to 4D together with reference to FIG. 1.

Referring to FIG. 3A and FIG. 3B, when viewing of the latest records, which may display all call records, is selected in the terminal, the controller 110 senses the selection of viewing of the latest records in step 301, and proceeds to step 302, in which the display unit 160 displays all the call records. Otherwise, in step 301, if a selection is not sensed, the controller 110 performs a different or relevant function of the terminal. In step 302, when the controller 110 controls the display unit 160 to display the latest records, the display unit 160 displays a telephone number among the latest records, to which a call has been originated and to which the call has not been connected, which is separately stored in the temporary list, in such a manner as to distinguish the telephone number from other telephone numbers, for example, by using a particular icon.

Figure 4A:
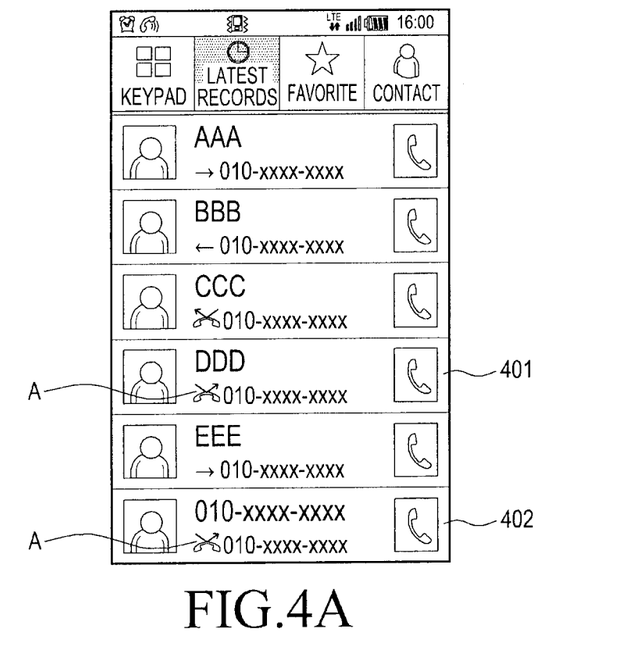
FIG. 4A, FIG. 4B, FIG. 4C and FIG. 4D are views illustrating an operation of displaying and editing a telephone number stored in the temporary list in the terminal according to the exemplary embodiment of the present invention.

FIG. 4A illustrates a list of the latest records, which may be displayed by activating or selecting a LATEST RECORDS icon or button displayed on the screen, or by other input commands in a manner known in the art. While the latest records are displayed as shown in the FIG. 4A, telephone numbers 401 and 402, to each of which a call has been originated and at each of which the call has not been connected, are displayed by using a particular icon A, and thereby are displayed in such a manner as to distinguish the telephone numbers 401 and 402 from other telephone numbers. For example, the particular icon A may represent an outgoing call bouncing off of a telephone to represent a call has been originated but the call has not been connected. The particular icon A is different from other call status icons, such as a rightward arrow representing an originated and connected call, a leftward arrow representing an incoming and connected call, and an ingoing call bouncing off of a telephone to represent a missed call, that is, an incoming call that had not connected. Accordingly, through the display of the particular icon A, a user may easily distinguish the telephone numbers 401 and 402, to each of which the call has been originated and at each of which the call has not been connected, from other telephone numbers.

When viewing of a temporary list is selected while the latest records are displayed, the controller 110 senses the selection of viewing of a temporary list, in step 303, and proceeds to step 304. Otherwise, in step 303, if a selection is not sensed, the controller 110 performs a different or relevant function of the terminal. In step 304, the controller 110 displays the telephone number to which the call has been originated and to which the call has not been connected, and a temporary telephone number, which are stored in the temporary list, in such a manner as to distinguish the call-originated telephone number from the temporary telephone number.

Figure 4B:
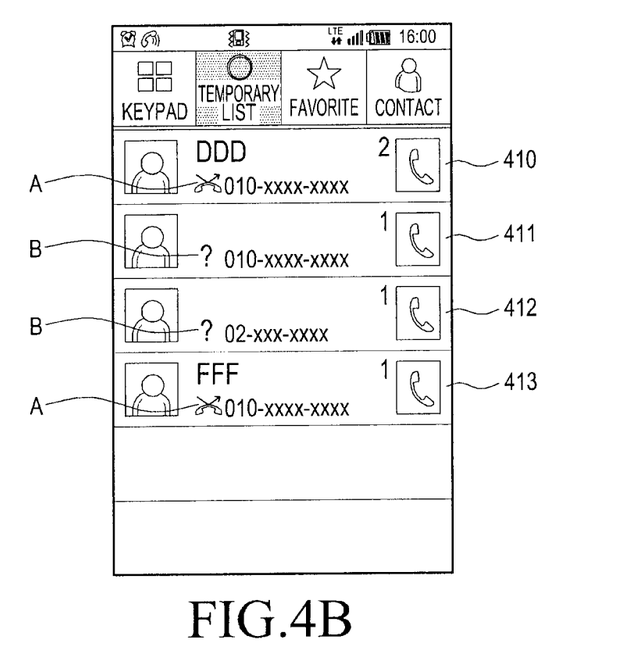

FIG. 4B illustrates the temporary list, which may be displayed by activating or selecting a TEMPORARY LIST icon or button displayed on the screen, or by other input commands in a manner known in the art. While the temporary list is displayed by the display unit 160 as shown in the FIG. 4B, telephone numbers 410 and 413, to each of which a call has been originated and at each of which the call has not been connected, are displayed by using the particular icon A, and temporary telephone numbers 411 and 412 are displayed by using another particular icon B, for example, a question mark. Accordingly, two icons may be displayed substantially adjacent to their respective telephone numbers in such a manner as to distinguish between the two telephone number types. In addition, the number of times of failure in a call connection to each telephone number is entered and displayed for each of the telephone numbers 410 and 413, to each of which the call has been originated and at each of which the call has not been connected, and for each of the temporary telephone numbers 411 and 412, which are displayed in the temporary list as shown in the FIG. 4B. For example, the "2" substantially adjacent the telephone number 410 represents two failed call connections for telephone number 410, while the "1" substantially adjacent to each of the telephone numbers 411-413 represents one failed call connection to each of telephone numbers 411-413. The telephone numbers 410-413 of the temporary list may be displayed in such a manner as to be arranged in descending order of the large number of times of failure in a call connection, but other orders for displaying the telephone numbers 410-413 may also be implemented.

Accordingly, through the display of the particular icon A, the user may easily distinguish the telephone numbers 401 and 402, to each of which the call has been originated and at each of which the call has not been connected, from other telephone numbers.

Referring back to step 304, after display of the telephone numbers, when the editing of a selected particular telephone number is selected while the temporary list is displayed, the controller 110 senses the selection of the editing of the selected particular telephone number, in step 305, and controls the display unit 160 to display types of editing in steps 306-312 in FIG. 3B. Otherwise, in step 305, if a selection is not sensed, the controller 110 performs a different or relevant function of the terminal.

Referring to FIG. 3B, when a memo is selected from among the types of editing, the controller 110 senses the selection of the memo, in step 306, and controls the display unit 160 to display a memo window. When contents are first entered into the memo window and then a storage is selected, the controller 110 proceeds to step 308, in which the controller 110 adds the memo to the particular telephone number and stores the memo and the association of the memo with the particular telephone number in the memory 130. The method then ends.

Otherwise, referring back to step 306, if the controller 110 does not sense a selection of a memo, when an alarm is selected from among the types of editing, the controller 110 senses the selection of the alarm, in step 309, and causes the terminal to switch to an alarm mode. When a particular alarm time point for reporting the origination of a call to the particular telephone number is selected in the alarm mode, the controller 110 proceeds to step 310, in which the controller 110 sets an alarm for the particular telephone number and stores the alarm and its information, including the particular alarm time point, and the association of the alarm, with the particular telephone number in the memory 130. The method then ends.

Otherwise, referring back to step 309, if the controller 110 does not sense a selection of an alarm, when a schedule is selected from among the types of editing, the controller 110 senses the selection of the schedule, in step 311, and causes the terminal to switch to a schedule mode. When a particular date and a particular time point are selected from a schedule in the schedule mode in order to report the origination of a call to the particular telephone number at the particular time point on the particular date, the controller 110 proceeds to step 312, in which the controller 110 sets the schedule for the particular telephone number and stores the schedule and its information, including the particular data and the particular time point, and the association of the schedule, with the particular telephone number in the memory 130. The method then ends. Otherwise, referring back to step 311, if a selection is not sensed, the controller 110 performs a different or relevant function of the terminal.

Figure 4C:
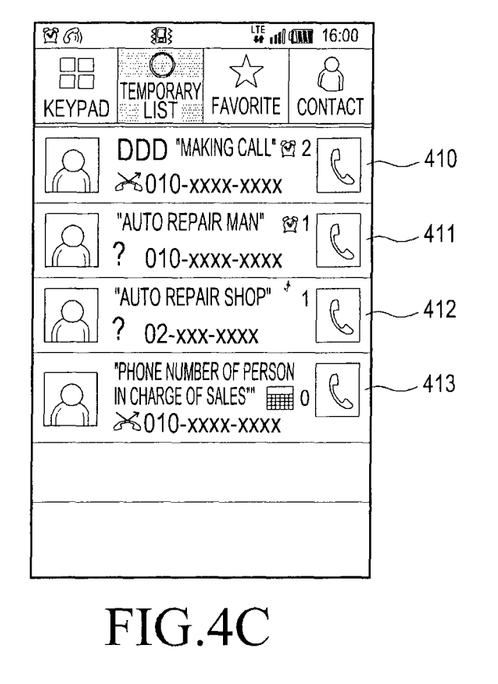

FIG. 4C shows an example of displaying the telephone numbers in the temporary list, for each of which a memo, an alarm or a schedule is set through the editing operation, and described in connection with FIG. 3B.

As shown in the FIG. 4C, the memo of "making a call" and an alarm are set for the particular telephone number 410, and the memo of "auto repair man" and an alarm are set for the particular telephone number 411, with alarm icons represented by a miniature clock picture displayed substantially adjacent to the respective particular telephone number 410, 411, indicating the set alarms for the telephone numbers 410, 411. In addition, the memo of "auto repair shop" is set for the particular telephone number 412, and the memo of "phone number of person in charge of sales" and a schedule are set for particular telephone number 413, with a schedule icon represented by a miniature calendar is displayed substantially adjacent to the particular telephone number 413.

When memo contents are selected from the temporary list as shown in FIG. 4C, for example, by tapping or selecting the text of the memo on the screen for a selected telephone number, a memo window which shows the memo contents may be displayed in a memo editing window or screen by the display unit 160, and the memo contents in the memo window may be changed, in a manner known in the art.

When an alarm icon is selected from the temporary list as shown in FIG. 4C, for example, by tapping or selecting the alarm icon on the screen for a selected telephone number, the terminal may switch to an alarm mode and may display a set alarm, and the alarm setting may be changed using an alarm editing window or screen, in a manner known in the art. When a schedule icon is selected from the temporary list, as shown in the FIG. 4C, for example, by tapping or selecting schedule icon on the screen for a selected telephone number, the terminal may switch to a schedule mode and may display the particular telephone number on a set particular date, and a date or a time point for which a schedule is set may be changed in a schedule editing window or screen by the display unit 160 in a manner known in the art.

Figure 4D:
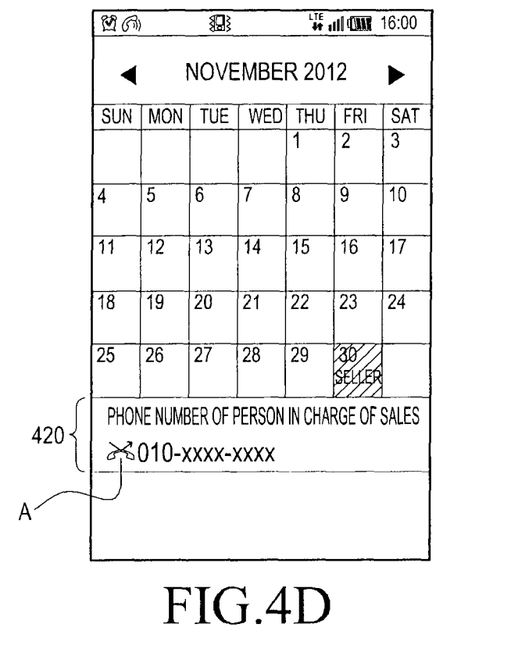

Otherwise, in response to user inputs to enter the schedule mode without accessing the telephone list in FIG. 4C, when the terminal switches to the schedule mode, if there exists a particular telephone number for which a schedule is set on a particular date among telephone numbers of the temporary list, as shown in FIG. 4D, the controller 110 may control the display unit 160 to display a calendar as well as the particular telephone number, for which the schedule is set among telephone numbers of the temporary list, on the particular date. When the particular date is selected, the controller 110 may control the display unit 160 to display information on the particular telephone number at a lower end 420 of a screen of the display unit 160. Alternatively, the display information may be positioned at any location on the screen in FIG. 4D.

When an icon A, which reports or indicates that a call was originated and does not terminate, is selected by tapping or other user inputs on the icon A in FIG. 4D while the information on the particular telephone number is displayed at the lower end 420 of the screen of the display unit 160, the controller 110 may control the display unit 160 display the temporary list as shown in FIG. 4C.

Figure 5A:
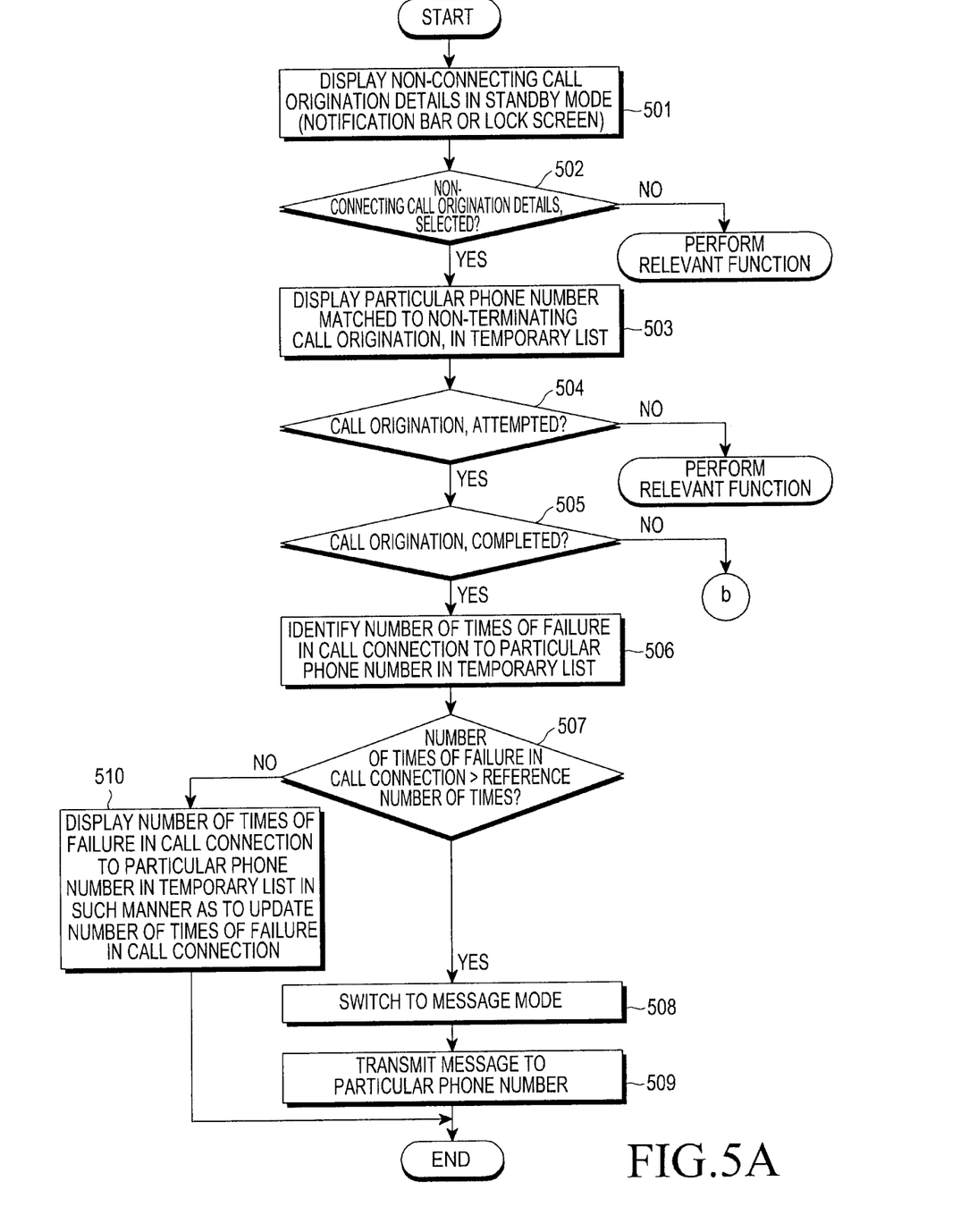
FIG. 5A and FIG. 5B are a single flowchart showing an operation process for originating a call to a telephone
Figure 5B:
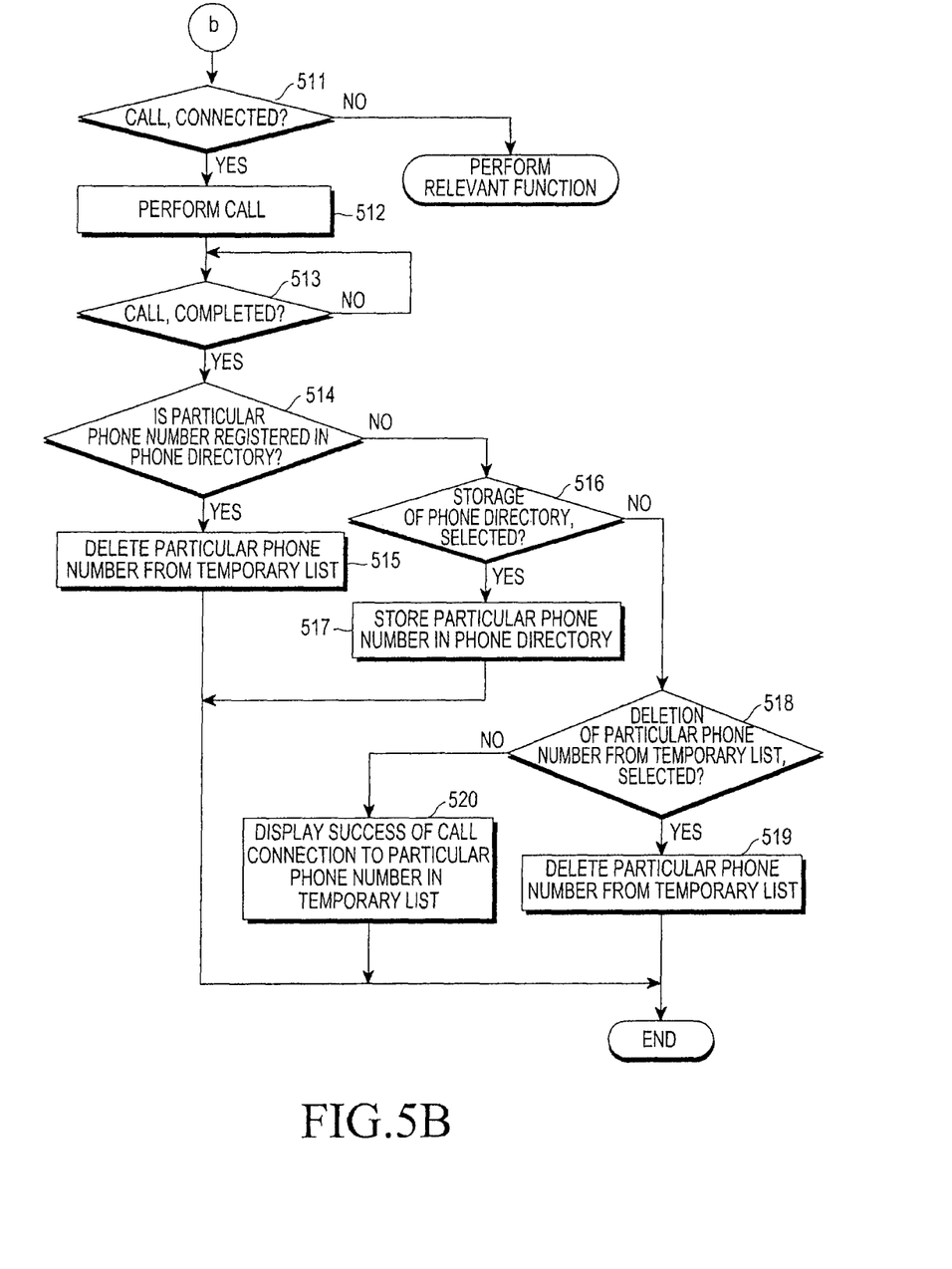

FIG. 5A and FIG. 5B are a single flowchart showing an operation process for originating a call to a telephone number stored in the temporary list in the terminal according to the exemplary embodiment of the present invention.

Hereinafter, the exemplary embodiment of the present invention will be described in detail with reference to FIG. 5A and FIG. 5B together with reference to FIGS. 1-2.

Referring to FIG. 2, when a telephone number, to which the call has been originated and to which the call has not been connected, is generated in steps 201-206 as shown in FIG. 2, the method for generating the temporary list and storing telephone numbers therein ends. However, the terminal also performs additional operations for originating a call to a telephone number stored in the temporary list, as shown in FIGS. 5A-5B, such that the controller 110 proceeds to step 501, in which the controller 110 controls the display unit 160 to display non-connecting call origination details in the standby mode of the terminal.

The non-connecting call origination details may be displayed on a lock screen, a window, or in a notification bar of the display unit 160 in the standby mode in step 501, and the controller 110 may control the display unit 160 to display the number of times of the origination of the call which has not been connected, together with an icon which reports that a call is originated and does not terminate, as in FIGS. 4A-4B.

After step 501, when the non-connecting call origination details are selected, the controller 110 senses the selection of the non-connecting call origination details, in step 502, and proceeds to step 503, in which the display unit 160 displays the particular telephone number, matched to the origination of the call which has not been connected, in the temporary list. Referring back to step 502, if the selection is not sensed, the controller 110 performs a different or relevant function of the terminal.

After step 503, when an attempt to originate a call to the particular telephone number is selected, the controller 110 senses the selection of the attempt to originate the call, in step 504, and attempts to originate the call to the particular telephone number, and proceeds to step 505. Otherwise, in step 504, if a call origination attempt is not sensed, the controller 110 performs a different or relevant function of the terminal. In step 505, when the origination of the call is completed in a state where the call is not connected to the particular telephone number, the controller 110 senses the completion of the origination of the call, in step 505, and proceeds to step 506. Otherwise, if the controller 110 does not sense the completion in step 505, the method proceeds to step 511, described herein. Referring back to step 506, the controller 110 identifies and stores or lists the number of times of failure in a call connection to the particular telephone number in the temporary list.

When the number of times of failure in the call connection to the particular telephone number is equal to or less than a predetermined reference number of times, the controller 110 senses, in step 507, that the number of times of failure in the call connection to the particular telephone number is equal to or less than the predetermined reference number of times, and proceeds to step 510. In step 510, the controller 110 controls the display unit 160 to display the number of times of failure in a call connection to the particular telephone number in the temporary list and the controller 110 also updates a value stored in the memory 130 representing the number of times of failure. The method of FIG. 5A then ends.

Referring back to step 507, when the number of times of failure in the call connection to the particular telephone number is greater than the predetermined reference number of times, the controller 110 senses, in step 507, that the number of times of failure in the call connection to the particular telephone number is greater than the predetermined reference number of times, and proceeds to step 508, in which the controller 110 causes the terminal to automatically switch to a message mode. Then, the controller 110 proceeds to step 509, in which the controller 110 controls the terminal to transmit a message having contents entered in the message mode to the particular telephone number. The method of FIG. 5A then ends.

Alternatively, when automatic message transmission is set for the terminal, if the number of times of failure in the call connection to the particular telephone number is greater than the predetermined reference number of times sensed in step 507, the controller 110 may transmit a message including previously-set contents to the particular telephone number.

Referring back to step 505, when an attempt to originate a call to the particular telephone number displayed in step 503 is made and the call is not connected to the particular telephone number, the controller 110 senses the lack of completion of the origination of the call, in step 505, and the method proceeds to step 511 in FIG. 5B. If the call is connected to the particular telephone number, the controller 110 senses, in step 511, that the call is connected to the particular telephone number, and proceeds to step 512, in which the controller 110 controls the terminal which performs the call. On the other hand, if in step 511, the controller 110 does not sense a call connection, the controller 110 performs a different or relevant function of the terminal.

Referring back to step 512, after the call is completed, the controller 110 senses the completion of the call, in step 513. If the controller 110 does not sense completion, the method loops back to step 513 and repeatedly checks whether the call was completed. However, in step 513, if the controller 110 senses completion, the method proceeds to step 514, and determines whether the particular telephone number, to which the call has been connected, is a telephone number registered in a telephone directory.

When the particular telephone number is a telephone number registered in the telephone directory, the controller 110 senses, in step 514, that the particular telephone number is a telephone number registered in the telephone directory, and proceeds to step 515. In step 515, the controller 110 deletes the particular telephone number from the temporary list, and the method ends.

However, referring back to step 514, when the particular telephone number is not a telephone number registered in the telephone directory, the controller 110 controls the display unit 160 to display a selection menu including various options, such as storing the telephone number in a telephone directory. The controller 110 then senses for a selection of storage of the telephone number in the telephone directory in step 516. When the storage of a telephone directory and/or a particular telephone number is selected from the selection menu, the controller 110 senses the selection in step 516, and the controller 110 proceeds to step 517, in which the controller 110 controls the memory 130 to store the particular telephone number in the telephone directory and/or to store an updated telephone directory including the particular telephone number, and the method then ends. Referring back to step 516, if storage of the telephone directory or particular telephone number is not sensed, the method proceeds to step 518 to sense whether the deletion of a particular telephone number from a temporary list is selected from the selection menu. If the controller 110 senses the selection of the deletion of the particular telephone number, in step 518, the method proceeds to step 519, in which the controller 110 deletes the particular telephone number from the temporary list and updates the temporary list stored in the memory 130, and the method then ends. However, in step 518, if the controller 110 does not sense the selection of deletion, the controller 110 controls the display unit 160 to display a message or other information indicating success of a call connection to the particular telephone number in the temporary list in step 520, and the method then ends.

As shown in FIG. 5B, an operation of registering or deleting a telephone number from the telephone directory is performed when the call is connected to the telephone number stored in the temporary list. However, in an alternative embodiment, the telephone numbers, to each of which the call has been connected, may not be deleted from the temporary list, but the success of the call connection to each of the telephone numbers may be displayed in the temporary list by using an icon or the like. Accordingly, the user may delete a telephone number, to which the call has been successfully connected, from the temporary list, or may register the telephone number in the telephone directory.

The apparatus and the method for managing a telephone number in the terminal according to the present invention may be implemented by using a computer-readable code in a computer-readable recording medium. The computer-readable recording mediums include all types of recording devices which may be read by a computer system and on which data are stored. Examples of the recording mediums include a Read Only Memory (ROM), a Random Access Memory (RAM), an optical disc, a magnetic tape, a floppy disk, a hard disc, a non-volatile memory, etc., and may also include data implemented in the form of carrier wave (e.g. transmission through the Internet). In addition, the computer-readable recording mediums are distributed in a computer system connected to a network, so that computer-readable codes may be stored in the distributed storage mediums and be executed in a distributed scheme.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

The present invention provides the apparatus and the method for managing a telephone number in the terminal, and has an effect in that a telephone number, to which a call has been originated and has not been connected, can be separately displayed in such a manner as to distinguish the telephone number from other telephone numbers and an attempt to originate a call to the telephone number can be conveniently made. In addition, the present invention has an effect in that a telephone number, which is not desired to be stored in a telephone directory, can be temporarily stored and then the terminal can conveniently attempt to originate a call to the telephone number while the terminal does not operate in an application executed in association with the telephone directory.

Although the present invention has been described with reference to the exemplary embodiments as shown in the accompanying drawings, the exemplary embodiments are only illustrative embodiments. It will be understood by those having ordinary knowledge in the technical field of the present invention that various modifications and other equivalent embodiments can be made from these exemplary embodiments. Therefore, the real technical protection scope of the present invention should be defined by the technical idea of the attached claims.

What is claimed is:

1. A mobile terminal comprising:
    a display unit; and
    a controller configured to:
    store at least one telephone number in association with contact information in a contact list,
    control the display unit to display a call history listing a plurality of telephone numbers,
    in response to a user selection selecting a telephone number from the plurality of telephone numbers listed in the call history, control the display unit to display an editing menu for adding additional information for the selected telephone number,
    in response to a request to add additional information for the selected telephone number in the editing menu, store the additional information for the selected telephone number, and
    control the display unit to display the call history including the selected telephone number and the additional information displayed adjacently to the selected telephone number,
    wherein the selected telephone number and the additional information are managed distinguishably from the contact list.

2. The mobile terminal of claim 1, wherein the controller is further configured to delete the selected telephone number from the display unit if the selected telephone number is registered in the contact list.

3. The mobile terminal of claim 1, wherein, the additional information provided in the call history is displayed with an identifier corresponding to the additional information being managed distinguishably from the contact list.

4. The mobile terminal of claim 1, wherein the controller is further configured to:
    after storing the additional information for the selected telephone number, process a call request associated with a particular telephone number,
    if the particular telephone number of the call request is stored in association with contact information of the contact list, display the particular telephone number with the contact information stored in the contact list for the particular telephone number in the call history, and
    if the particular telephone number of the call request is stored in association with the additional information, display the particular telephone number with the additional information for the particular telephone number in the call history.

5. The mobile terminal as claimed in claim 1, wherein the additional information comprises service information indicative of a type of category or classification related to the selected telephone number.

6. The mobile terminal of claim 1, wherein the controller is configured to:
    if the selected telephone number is unregistered in the contact list, execute storing contact information in association with the selected telephone number in the contact list and execute storing additional information in association with the selected telephone number being managed distinguishably from the contact list.

7. The mobile terminal of claim 3, wherein the additional information comprises service information indicative of a type of category or classification related to the selected telephone number, and
    wherein, when performing an editing procedure for the selected telephone number in the call history, the controller executes an operation of adding a memo into which the additional information on the selected telephone number is entered independently of the contact list, for displaying, in the call history, the additional information with the identifier corresponding to the additional information being managed distinguishably from the contact list.

8. The mobile terminal of claim 3, wherein, when performing an editing procedure for the selected telephone number in the call history, the controller executes an operation of adding a memo into which the additional information on the selected telephone number is entered independently of the contact list, for displaying, in the call history, the additional information with the identifier corresponding to the additional information being managed distinguishably from the contact list, and
    wherein the controller is configured to:
    if the selected telephone number is unregistered in the contact list, execute storing contact information in association with the selected telephone number in the contact list and execute storing additional information in association with the selected telephone number being managed distinguishably from the contact list.

9. The mobile terminal of claim 1, wherein the additional information comprises service information indicative of a type of category or classification related to the selected telephone number, and
    wherein the controller is configured to:
    if the selected telephone number is unregistered in the contact list, execute storing contact information in association with the selected telephone number in the contact list and execute storing additional information in association with the selected telephone number being managed distinguishably from the contact list.

10. The mobile terminal of claim 3, wherein the additional information comprises service information indicative of a type of category or classification related to the selected telephone number,
    wherein, when performing an editing procedure for the selected telephone number in the call history, the controller executes an operation of adding a memo into which the additional information on the selected telephone number is entered independently of the contact list, for displaying, in the call history, the additional information with the identifier corresponding to the additional information being managed distinguishably from the contact list, and
    wherein the controller is configured to:
    if the selected telephone number is unregistered in the contact list, execute storing contact information in association with the selected telephone number in the contact list and execute storing additional information in association with the selected telephone number being managed distinguishably from the contact list.

11. The mobile terminal as claimed in claim 1, wherein the additional information comprises mark information indicative of a type of category or classification related to the selected telephone number.

12. A non-transitory storage medium storing instructions which, when executed by at least one processor, cause the at least one processor to execute at least one operation comprising:
: storing at least one telephone number in association with contact information in a contact list,
: controlling a display unit to display a call history listing a plurality of telephone numbers,
: in response to a user selection selecting a telephone number from the plurality of telephone numbers listed in the call history, controlling the display unit to display an editing menu for adding additional information for the selected telephone number,
: in response to a request to add additional information for the selected telephone number in the editing menu, storing the additional information for the selected telephone number, and
: controlling the display unit to display the call history including the selected telephone number and the additional information displayed adjacently to the selected telephone number,
: wherein the selected telephone number and the additional information are managed distinguishably from the contact list.

13. The non-transitory storage medium of claim 12, wherein the at least one operation further comprises:
: deleting the selected telephone number from the display unit if the selected telephone number is registered in the contact list.

14. The non-transitory storage medium of claim 12, wherein, the additional information provided in the call history is displayed with an identifier corresponding to the additional information being managed distinguishably from the contact list.

15. The non-transitory storage medium of claim 12, wherein the at least one operation further comprises:
: after storing the additional information for the selected telephone number, processing a call request associated with a particular telephone number,
: if the particular telephone number of the call request is stored in association with contact information of the contact list, displaying the particular telephone number with the contact information stored in the contact list for the particular telephone number in the call history, and
: if the particular telephone number of the call request is stored in association with the additional information, displaying the particular telephone number with the additional information for the particular telephone number in the call history.

16. The non-transitory storage medium as claimed in claim 12, wherein the additional information comprises service information indicative of a type of category or classification related to the selected telephone number.

17. The non-transitory storage medium of claim 12, wherein the at least one operation further comprises:
: if the selected telephone number is unregistered in the contact list, storing contact information in association with the selected telephone number in the contact list and storing additional information in association with the selected telephone number being managed distinguishably from the contact list.

18. The non-transitory storage medium of claim 15, wherein the additional information comprises service information indicative of a type of category or classification related to the selected telephone number, and
: wherein, when performing an editing procedure for the selected telephone number in the call history, the at least one processor executes an operation of adding a memo into which the additional information on the selected telephone number is entered independently of the contact list, for displaying, in the call history, the additional information with an identifier corresponding to the additional information being managed distinguishably from the contact list.

19. The non-transitory storage medium of claim 15, wherein, when performing an editing procedure for the selected telephone number in the call history, the at least one processor executes an operation of adding a memo into which the additional information on the selected telephone number is entered independently of the contact list, for displaying, in the call history, the additional information with an identifier corresponding to the additional information being managed distinguishably from the contact list, and
: wherein the at least one operation further comprises:
: if the selected telephone number is unregistered in the contact list, execute storing contact information in association with the selected telephone number in the contact list and execute storing additional information in association with the selected telephone number being managed distinguishably from the contact list.

20. The non-transitory storage medium of claim 12, wherein the additional information comprises service information indicative of a type of category or classification related to the selected telephone number, and
: wherein the at least one operation further comprises:
: if the selected telephone number is unregistered in the contact list, execute storing contact information in association with the selected telephone number in the contact list and execute storing additional information in association with the selected telephone number being managed distinguishably from the contact list.

21. The non-transitory storage medium of claim 15, wherein the additional information comprises service information indicative of a type of category or classification related to the selected telephone number,
: wherein, when performing an editing procedure for the selected telephone number in the call history, the at least one processor executes an operation of adding a memo into which the additional information on the selected telephone number is entered independently of the contact list, for displaying, in the call history, the additional information with an identifier corresponding to the additional information being managed distinguishably from the contact list, and
: wherein the at least one operation further comprises:
: if the selected telephone number is unregistered in the contact list, execute storing contact information in association with the selected telephone number in the contact list and execute storing additional information in association with the selected telephone number being managed distinguishably from the contact list.

22. The non-transitory storage medium of claim 12, wherein the additional information comprises mark information indicative of a type of category or classification related to the selected telephone number.

* * * * *